United States Patent
Springer

(10) Patent No.: US 12,349,838 B2
(45) Date of Patent: Jul. 8, 2025

(54) OUTDOOR GRIDDLE

(71) Applicant: Walmart Apollo, LLC, Bentonville, AR (US)

(72) Inventor: Zachary Springer, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 901 days.

(21) Appl. No.: 17/446,760

(22) Filed: Sep. 2, 2021

(65) Prior Publication Data
US 2022/0071445 A1 Mar. 10, 2022

Related U.S. Application Data

(60) Provisional application No. 63/074,973, filed on Sep. 4, 2020.

(51) Int. Cl.
*A47J 37/06* (2006.01)
*A47J 37/07* (2006.01)

(52) U.S. Cl.
CPC ....... *A47J 37/0713* (2013.01); *A47J 37/0682* (2013.01); *A47J 37/0786* (2013.01)

(58) Field of Classification Search
CPC ............ A47J 37/0713; A47J 37/0682; A47J 37/0786; A47J 37/07; A47J 37/01
See application file for complete search history.

(56) References Cited

U.S. PATENT DOCUMENTS

| | | | | |
|---|---|---|---|---|
| 3,317,709 A * | 5/1967 | Beasley | ................ | F24C 15/105 219/465.1 |
| 3,714,885 A * | 2/1973 | Wertheimer | ........ | A47J 37/0676 99/425 |
| 4,091,579 A * | 5/1978 | Giangiulio | .............. | B08B 1/165 451/461 |
| 2006/0016348 A1* | 1/2006 | Babington | .......... | A47J 37/0781 99/422 |
| 2006/0042621 A1* | 3/2006 | Besal | ...................... | F24C 15/20 126/299 D |
| 2007/0221202 A1* | 9/2007 | Bruno | ................. | A47J 37/0713 126/41 R |
| 2019/0365152 A1* | 12/2019 | Dahle | .................... | A23B 4/052 |
| 2022/0022688 A1* | 1/2022 | Barajas, Jr. | ........... | A47J 37/067 |

* cited by examiner

*Primary Examiner* — Tiffany T Tran
(74) *Attorney, Agent, or Firm* — Foley IP Law, PLLC

(57) ABSTRACT

An outdoor griddle including a housing, a cooking surface, a drip drawer, and a heat source assembly. The cooking surface has a rectangular shape and is coupled within the housing. The cooking surface includes: a planar top portion; a front edge proximal to a griddle cook position; a back edge distal to the griddle cook position; a left side edge to the left of the griddle cook position; a right side edge to the right of the griddle cook position; a right-side debris management section located in the planar top portion at an area adjacent the right side edge, providing convenient access to right-handed cooking utensil interactions; and at least one aperture extending in an elongated fashion along the right-side debris management section of the cooking surface that provide passages for grease and debris to drain. The drip drawer coupled beneath the aperture(s) to catch grease and debris.

15 Claims, 15 Drawing Sheets

OUTDOOR GRIDDLE

RELATED APPLICATION

The present application claims the benefit of U.S. Provisional Application No. 63/074,973 filed Sep. 4, 2020, which is hereby incorporated herein in its entirety by reference.

TECHNICAL FIELD

This disclosure relates to an outdoor griddle, and more particularly to an outdoor griddle with a versatile cooking surface and design which is configured for users and provides debris management features, an advantageous layout, and an easy-to-use and clean apparatus.

BACKGROUND

Outdoor griddles are a popular type of cooking equipment that provides a wide range of cooking options and advantages. Outdoor griddles generally permit cooking with a generally flat top cooking surface that lacks grates or large openings found in outdoor grills. Cooking techniques permitted on griddles can be versatile and the types and sizes of food applicable to griddle preparation is wide-ranging.

A potential issue to deal with when using such a griddle, however, is the effective management of grease and debris that can collect on these during and after cooking. A griddle that can address managing these issues well and which serves as a convenient and effective food preparation tool is desired.

Accordingly, there is a desire for an improved apparatus or solution permitting an outdoor griddle with a generally flat top cooking surface to provide a desirable food preparation tool with enhanced effectiveness and convenience and which minimizes past difficulties related to management of grease and debris.

SUMMARY

Embodiments described or otherwise contemplated herein substantially provide a effective and convenient outdoor griddle for cooking which enhances cooking capabilities and minimizes past difficulties related to management of grease and debris.

One embodiment relates to an outdoor griddle including a housing, a cooking surface, a drip drawer, and a heat source assembly. The housing includes a pivotally mounted or removable cover. The cooking surface has a rectangular shape and is coupled within the housing. The cooking surface includes: a planar top portion; a front edge, comprising a first vertically-disposed panel abutting the planar top portion, proximal to a griddle cook position; a back edge, comprising a second vertically-disposed panel abutting the planar top portion, distal to the griddle cook position; a left side edge, comprising a third vertically-disposed panel abutting the planar top portion, to the left of the griddle cook position; a right side edge, comprising a fourth vertically-disposed panel abutting the planar top portion, to the right of the griddle cook position; a right-side debris management section, located in the planar top portion at an area adjacent the right side edge, providing convenient access to right-handed cooking utensil interactions; and at least one aperture extending in an elongated fashion along the right-side debris management section of the cooking surface that provides passage for grease and debris to drain. The drip drawer has an elongate shape and is slideably and removeably coupled beneath the at least one aperture to catch grease and debris. The heat source assembly is located beneath the cooking surface and are controlled by corresponding heat regulation controls.

One embodiment relates to an outdoor griddle including a housing, cooking surface, and a heat source assembly. The cooking surface is of rectangular shape and is coupled within the housing. The cooking surface includes: a planar top portion; a front edge, proximal to a griddle cook position; a back edge, comprising a vertically-disposed panel abutting the planar top portion, distal to the griddle cook position; a left side edge, comprising a vertically-disposed panel abutting the planar top portion, to the left of the griddle cook position; a right side edge, comprising a vertically-disposed panel abutting the planar top portion, to the right of the griddle cook position; and a right-side debris management section of the planar top portion including an elongate aperture with beveled edge of lower elevation compared to other portions of the planar top portion. The right-side debris management section adjacent the right side edge provides convenient access to right-handed cooking utensil interactions by a user to manage grease and debris. The heat source assembly is located beneath the cooking surface and is controlled by corresponding heat regulation controls.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which.

Figure 1A:
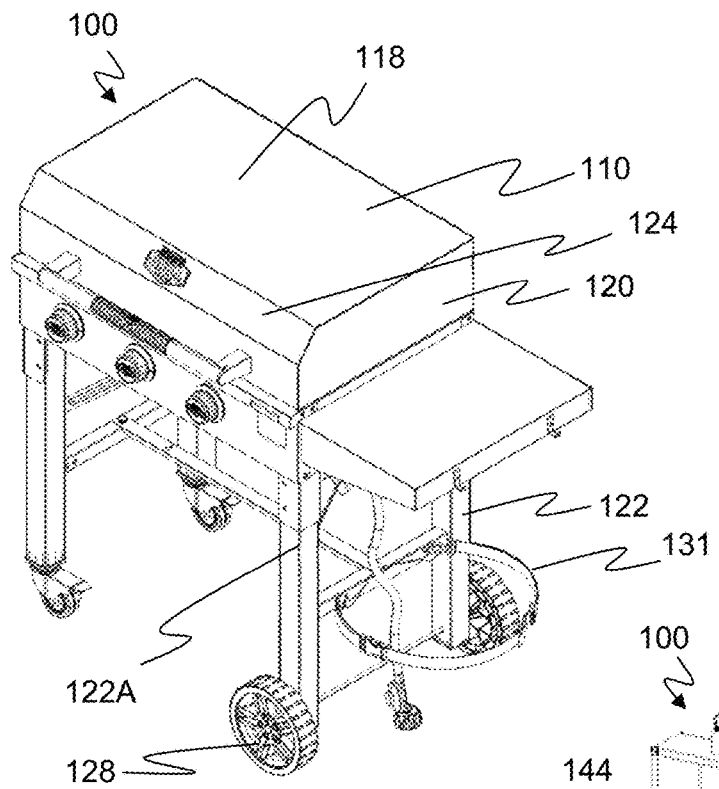
FIG. 1A is a perspective view of an outdoor griddle, according to an embodiment.

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments generally relate to outdoor griddles. Throughout this disclosure, the term "outdoor griddle" or "griddle" may be used to generally refer to any of a variety of different types of griddles, outdoor griddles, outdoor tabletop griddles, combination griddles, other types of griddle, flat surfaced grills, or similar apparatus of generally flat cooking surface, and should be understood to broadly encompass these types of apparatus.

FIGS. 1-8B each show an outdoor griddle 100, 100', 100A, 100B, 100C, 100D or portions thereof alone or in combination with other features in various configurations. Note that throughout this disclosure, outdoor griddles of reference numerals 100, 100', 100A, 100B, 100C, and 100D will also be generically described and referred to by reference numeral 100 at times, and accordingly, should be broadly construed and viewed as applicable to all griddle embodiments whenever possible and applicable.

Figure 1B:
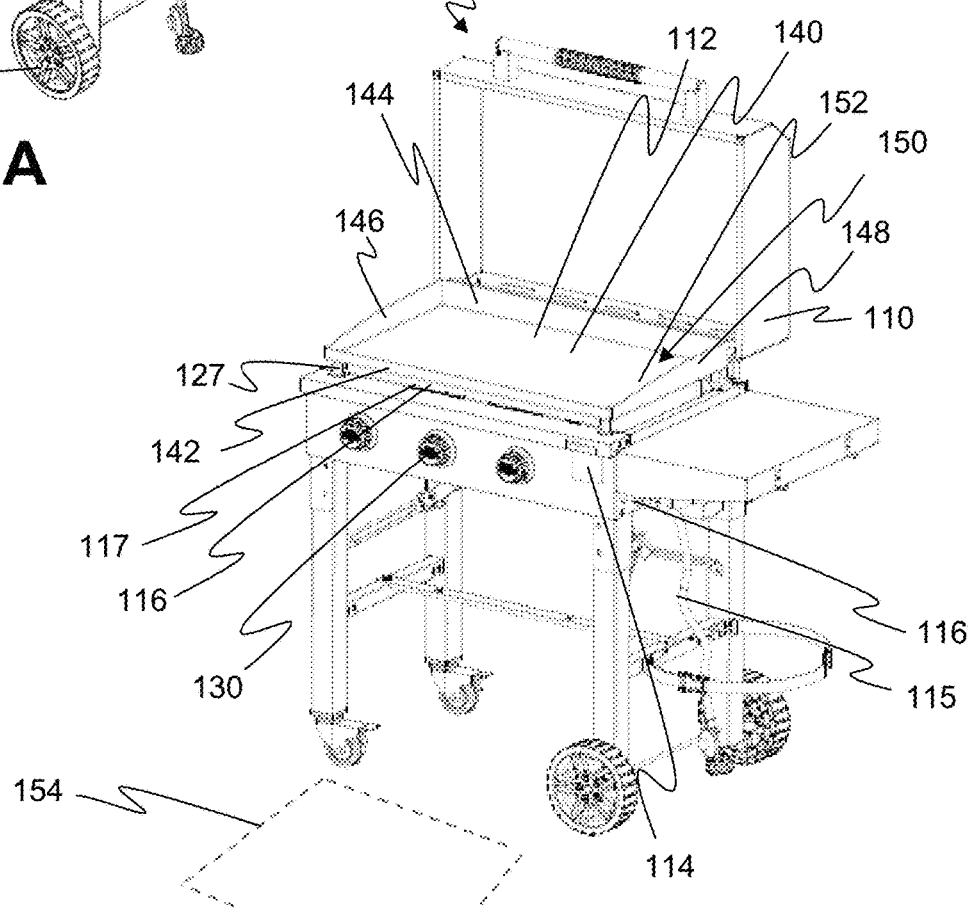
FIG. 1B is a perspective view of an outdoor griddle with open cover, according to an embodiment.

Referring first to FIGS. 1A and 1B, an outdoor griddle 100 is shown that generally includes a housing 110, cooking surface 112, drip drawer 114, and a gas line hose and connector 115 that connects between a heat source assembly 116 and a fuel source (not shown). The housing 110 can include a pivotally mounted or removable cover 118, a base 120, and legs or other supporting structure 122. When closed, cover 118 can sit on the base 120 and surround the top of the cooking surface 112 in order to retain heat and high temperatures in the area where food is being cooked. Some embodiments of the cover 118 may include angled upper front surface 124. In some embodiments, an angled upper rear surface 126 may be included as well (See FIG. 6, for example). A variety of shapes of covers 118 for various embodiments are contemplated and may be used to assist in cooking and obtaining a desired heat distribution.

The base 120 can be shaped to surround heat source assembly 116, which includes components such as burners 117, and support the cooking surface 112. In some embodiments, the cooking surface 112 is supported on posts 127 at its lower corners that help provide clearance above the heat source assembly 116.

Figure 1C:
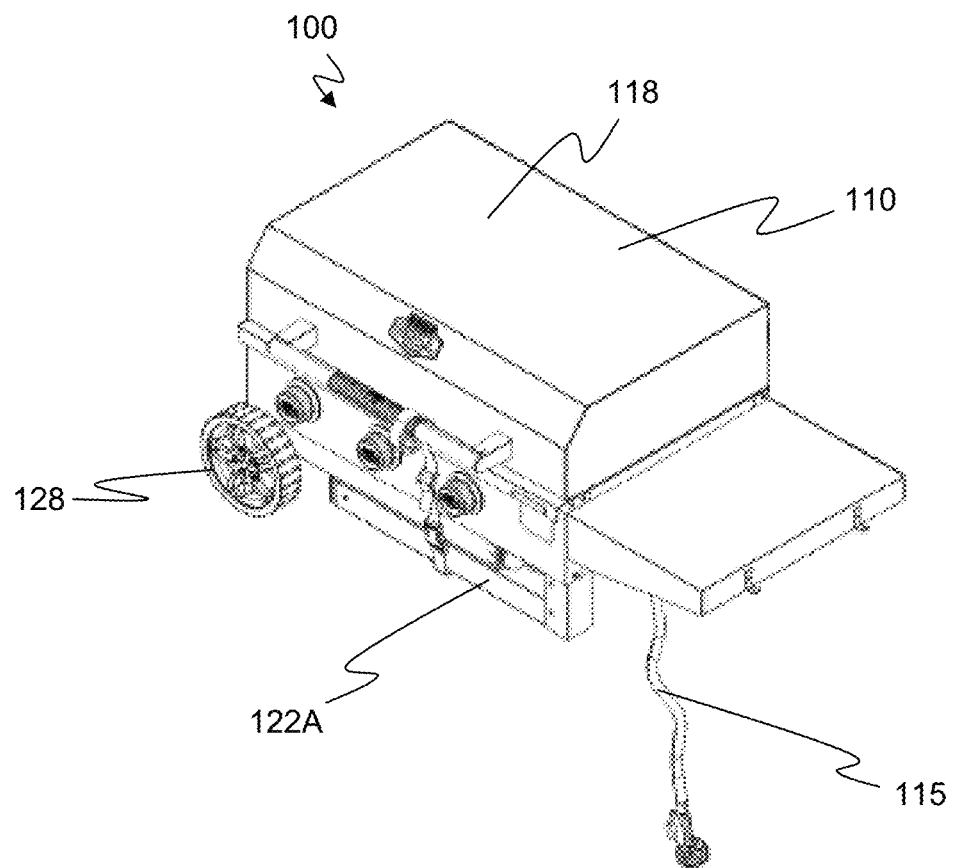
FIG. 1C is a perspective view of an outdoor griddle in a folded state for storage or transport, according to an embodiment.

The supporting structure 122 may include a plurality of vertically-disposed legs 122A to support the remainder of the outdoor griddle 100. As shown in FIG. 1C, the legs 122A of the supporting structure 122 may be hinged and foldable and include wheels 128 for convenient movement and/or storage.

Figures 1D, 1E:
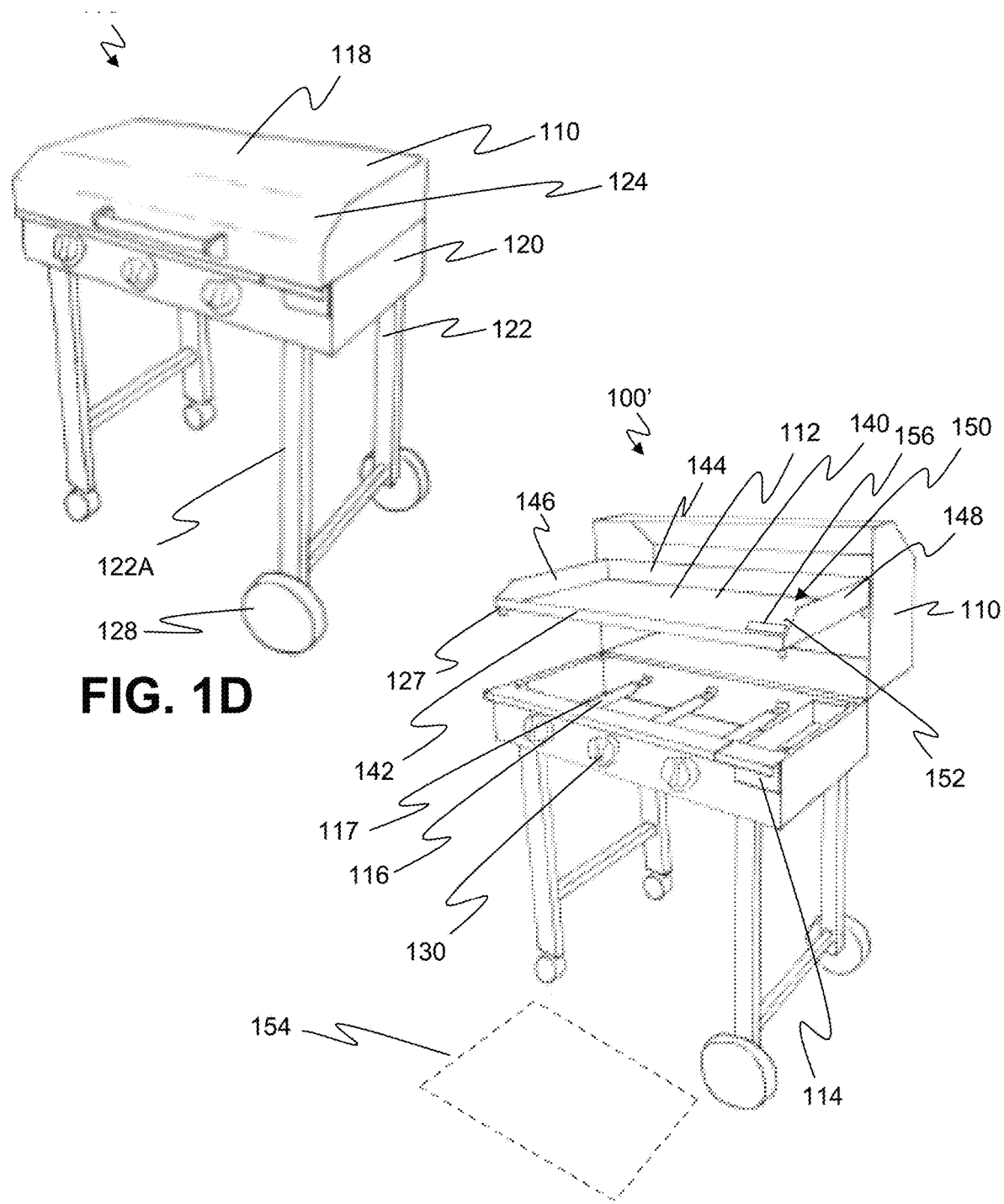
FIG. 1D is a perspective view of an outdoor griddle, according to an embodiment.
FIG. 1E is a perspective view of a partially-disassembled outdoor griddle with an open cover and a separated cooking surface shown in a suspended location, according to an embodiment.
Figure 1F:
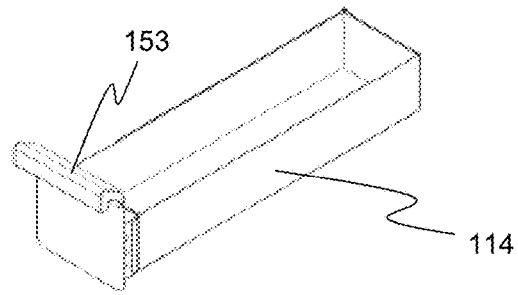
FIG. 1F is a perspective view of a drip drawer of the outdoor griddle of FIG. 1A, according to an embodiment.
Figure 1G:
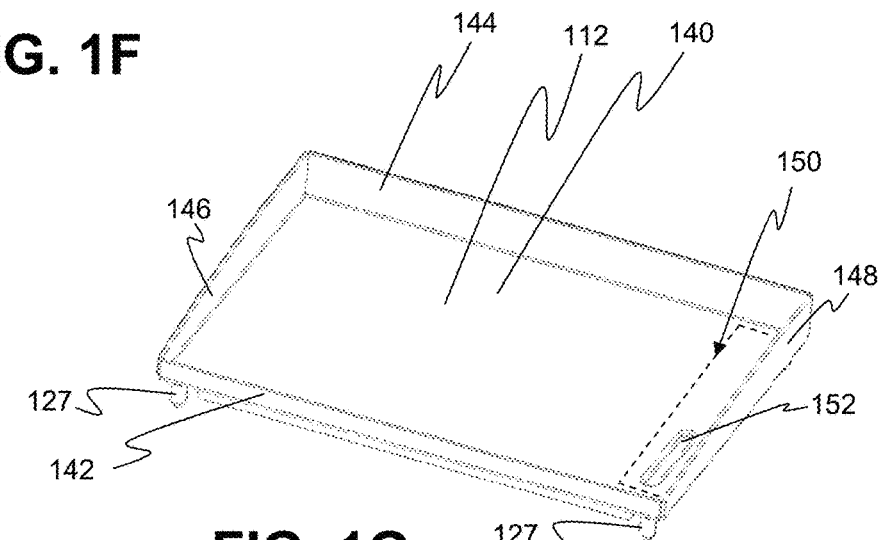
FIGS. 1G-1M show views of a cooking surface for an outdoor griddle of FIG. 1B, according to an embodiment.

FIGS. 1D and 1E show a slightly different arrangement for outdoor griddle 100'. Note that in FIG. 1E, the cooking surface 112 is shown displaced from its intended location within the base 120, just above the heat source assembly 116, for illustrative purposes rather than an actual location for use.

The heat source assembly 116 may be made up of one or more burners 117. The burners 117 may be elongate burners as shown in FIG. 1B or U-shaped burners, as shown in FIG. 4E, for example. Other burner arrangements and configurations are possible. Burners 117 may burn propane in various outdoor embodiments, but may burn natural gas or other suitable fuel in certain embodiments. The heat source assembly 116 is located beneath the cooking surface 112 and is controlled by corresponding heat regulation controls 130. FIGS. 1A-C show a outdoor griddle design with a mounting strap 131 for holding a propane tank or other source of fuel. While not specifically depicted, such a propane tank could be coupled to the hose and connector 115 to supply fuel to the heat source assembly 116, for example In various embodiments, the drip drawer 114 is a structure of elongate shape that is slideably and removeably coupled beneath apertures 152 located in the cooking surface 112 to catch grease and debris. The drip drawer 114 is front loaded and manipulable for easy use and access. The drip drawer 114 may form a receptacle of various shapes and sizes and include a handle 153 at the front. The drip drawer 114 accordingly, can be pulled horizontally toward a user for removal and cleaning of its contents. An example of a drip drawer 114 is shown removed from griddle 100 in FIG. 1F. The drawer can be entirely removed for cleaning. The drip drawer 114 extends the full depth of the cooking surface 112 of griddle 100, which allows for significant debris collection.

Figure 1H:
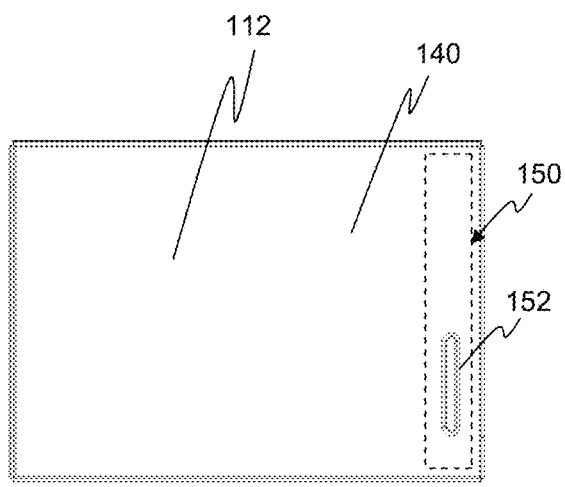
Figure 1I:
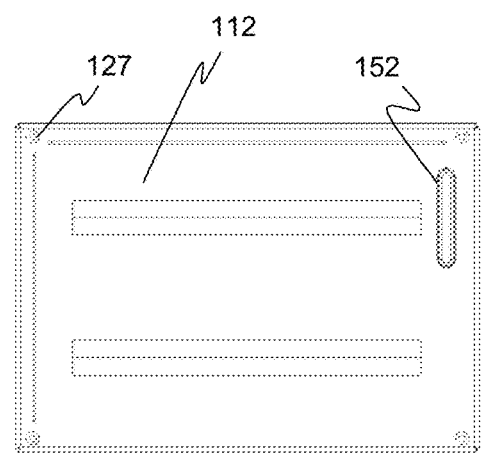
Figure 1J:
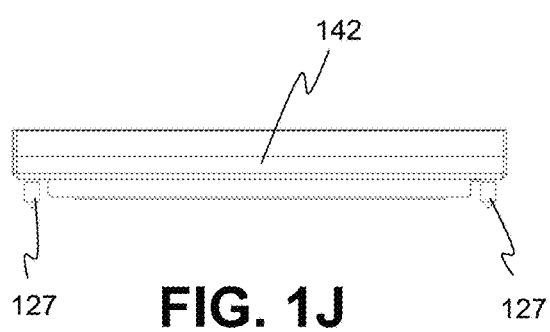
Figure 1K:
Figure 1L:
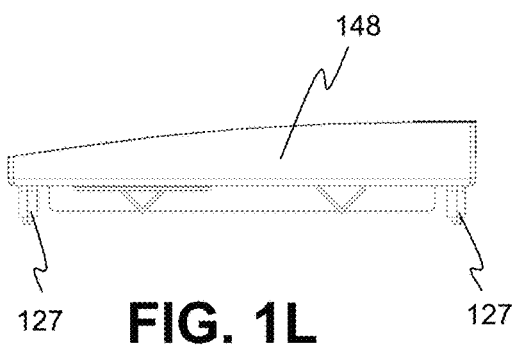
Figure 1M:
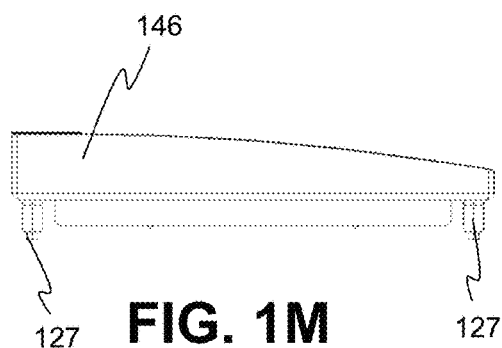
Figure 2A:
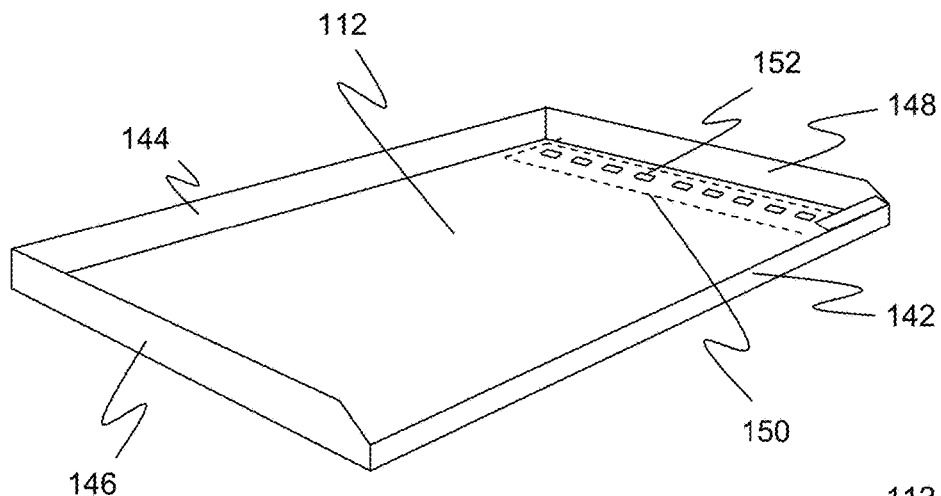
FIG. 2A is a top perspective view of a cooking surface for an outdoor griddle, according to an embodiment.
Figure 2C:
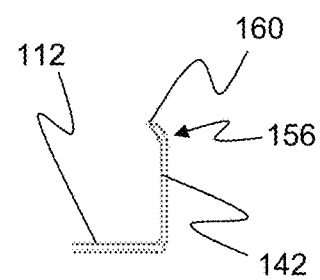
FIG. 2C is a cross-sectional view of a spatula scraper extending from the front edge of the cooking surface at Section 2C of FIG. 2A, according to an embodiment.
Figure 2B:
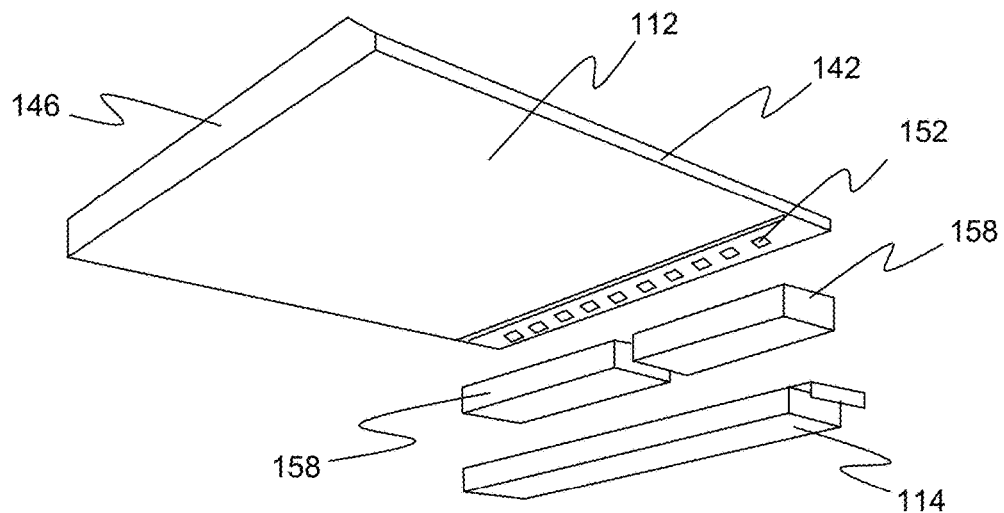
FIG. 2B is a bottom perspective exploded view of a cooking surface for an outdoor griddle, drip drawer, and grease liners, according to an embodiment.

Cooking surface 112, as depicted with outdoor griddle 100 in FIG. 1B, is shown in greater detail in FIGS. 1G-M and alternatively in FIGS. 2A-C. Cooking surface 112 is generally of rectangular shape and couples within the housing 110. The cooking surface 112 includes a planar top portion 140, a front edge 142, a back edge 144, a left side edge 146, a right side edge 148, a right side debris management section 150 and a one or more apertures 152. FIGS. 1G-M shown an embodiment with one elongate oval-shaped aperture 152 and FIGS. 2A-C shown an embodiment with a plurality of apertures 152.

The planar top portion 140 is generally deemed to be a horizontally disposed flat surface without large spaces or large discontinuities. In some embodiments, part or all of the planar top portion 140 may be sloped slightly downward toward the portion containing apertures 152.

The front edge 142 includes a vertically disposed panel abutting the planar top portion 140. The front edge 142 is proximal to a location directly adjacent the front side of the griddle in which a griddle user/cook would generally stand facing the griddle during the preparation of food. This location of the griddle user/cook is referred to and defined as such herein as the "griddle cook position 154" for purposes of this application and is used a common point of reference for describing the griddle 100 throughout this disclosure. In some embodiments, the front edge 142 is lower in vertical height than the other side edges 144, 146, and 148 for easier access to the cooking surface 112 from the front.

The back edge 144 includes a vertically disposed panel abutting the planar top portion 140. The back edge 144 is located distal to the griddle cook position 154.

The left side edge 146 includes a vertically disposed panel abutting the planar top portion 140, to the left of the griddle cook position 154. Left side edge 146 is generally uniform in height but tapers for a short distance at the front of the griddle.

The right side edge 148 includes a vertically disposed panel abutting the planar top portion 140, to the right of the griddle cook position 154. Right side edge 148 is generally uniform in height but tapers for a short distance at the front of the griddle.

The right side debris management section 150 is located in the planar top portion 140 at an area adjacent the right side edge. This section generally contains the aperture or apertures 152 for draining grease and debris and related structures. The right side debris management section 150 provides convenient access to right-handed users and their cooking utensil interactions with the griddle. Right-handed users can find it particularly beneficial to confine grease, debris, and other messy items to the right side, at the front of the grill. In various prior art designs for griddles, grease traps tend to be located along the entire front or middle front of the griddle. This can negatively interfere with desirable cooking space on the griddle that is easily accessible to the cook. Likewise, in some embodiments, a spatula scraper 156 is located directly in front of the right side debris management section 150. This will be described in greater detail with respect to FIG. 2C.

The aperture(s) 152 is/are shown extending in an elongated fashion along the right side debris management section 150 of the cooking surface 112. Aperture(s) 152 provide a passage for grease and debris to drain. The apertures 152 may include a large or small number of apertures which may be various sizes and shapes. Shapes can include rectangles, squares, ovals, or other geometric shapes.

FIG. 1H shows a top view of a cooking surface 112 with a single elongate, oval-shaped aperture 152. FIG. 1I shows a bottom view of the cooking surface 112 and FIGS. 1J-1M show front, rear, right side, and left side elevational views, respectively. The aperture 152 of this embodiment is oval-shaped with beveled edges for easy capture of debris and grease, even debris of significant size. In some embodiments, aperture 152 provides a slot 100 mm long and 10 mm wide. In some embodiments, aperture 152 is greater than 80 mm long and less than 120 mm long. In some embodiments aperture 152 is greater than 5 mm wide and less than 15 mm wide. Other combinations of these size parameters are contemplated herein as well.

FIG. 2B shows a bottom perspective exploded view of the cooking surface 112 of FIG. 2A. FIG. 2B further includes a drip drawer 114 and a pair of grease liners 158, each spaced apart from their respectively aligned locations. The disposable grease liners 158 can be understood to be sized to fit within the drip drawer 114 and catch grease and debris therein such that the liners 158 can be readily slid out with the drip drawer after griddle use and disposed of for convenient clean up.

FIG. 2C shows a cross-sectional view of a spatula scraper 156 extending from the front edge 142 of the cooking surface 112 at Section C of FIG. 2A. As shown in FIG. 2A, the spatula scraper 156 extends from the front edge 142 at a location in front of the right side debris management section 150. As shown, the spatula scraper 156 provides a lip 160 that projects upward and backward over the planar top portion 140 of the cooking surface 112.

Figure 3A:
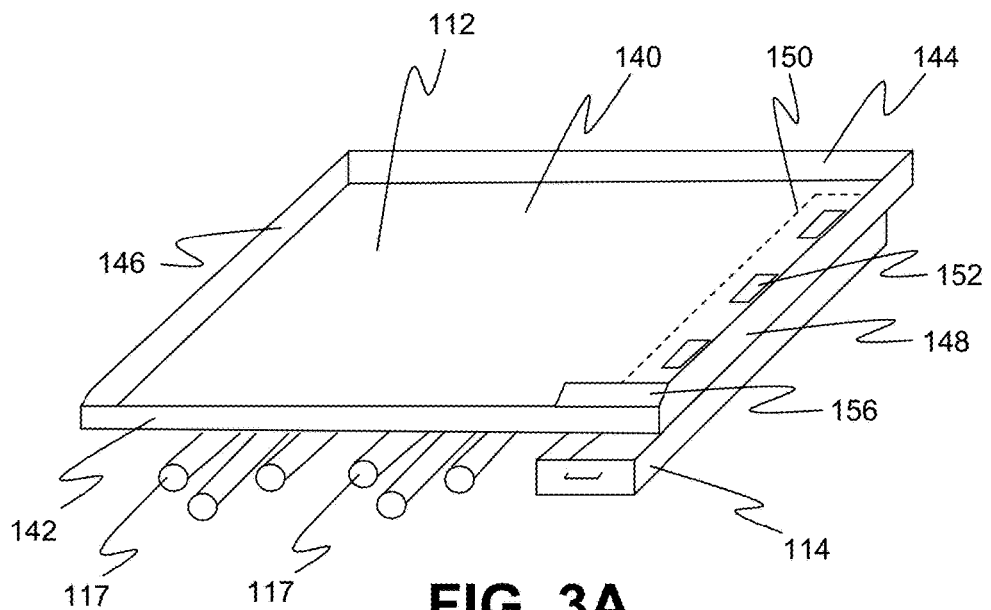
FIG. 3A is a perspective view of a cooking surface, drip drawer and burners for an outdoor griddle, according to an embodiment.
Figure 3B:
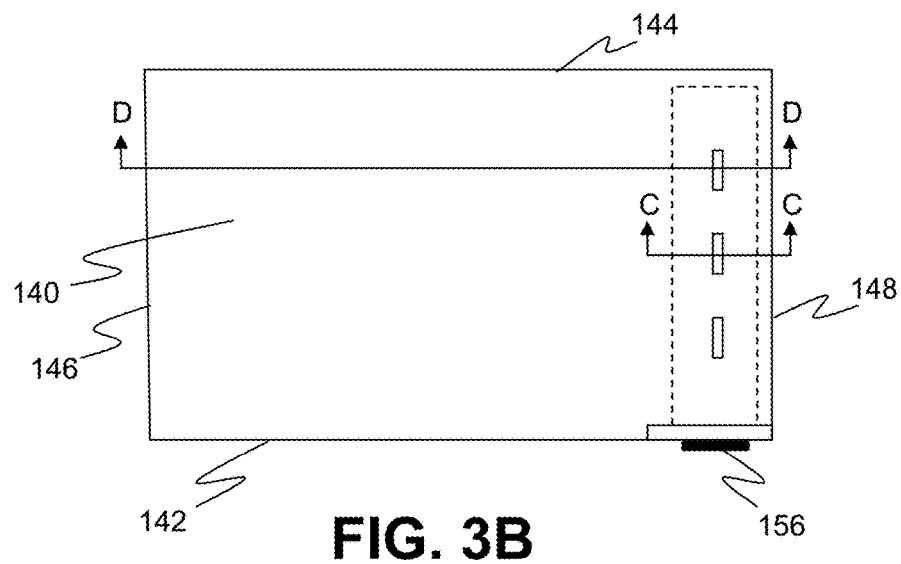
FIG. 3B is a top view of a cooking surface for an outdoor griddle, according to an embodiment.

FIGS. 3A and 3B show an alternative embodiment cooking surface 112 with similarities to the one disclosed in FIG. 2A from perspective and top views, respectively. The relative locations of drip drawer 114 and heat source assembly 116 in the form of U-shaped burners 117 are partially depicted as well. In this embodiment, the right side debris management section 150 is clearly shown on planar top portion 140 at an area adjacent the right side edge 148. The apertures 152 are shown extending in an elongated fashion along the right side debris management section 150 and include beveled surfaces 162 around each of their perimeters. These beveled surfaces 162 assist in funneling grease and debris off the cooking surface 112 into the drip drawer 114 below. Spatula scraper 156 is further located in front of the debris management section 150.

Figure 3D:
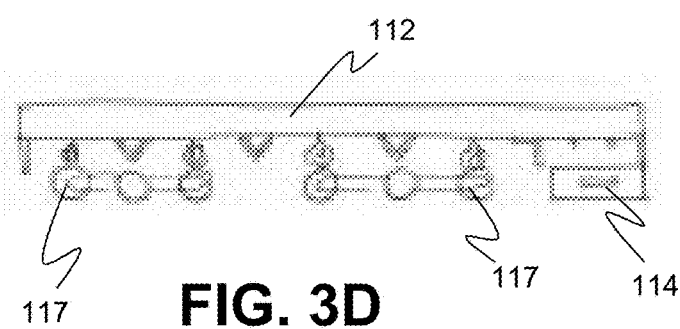
FIG. 3D is a cross-sectional view of a cooking surface for an outdoor griddle at D-D of FIG. 3B, according to an embodiment.
Figure 3C:
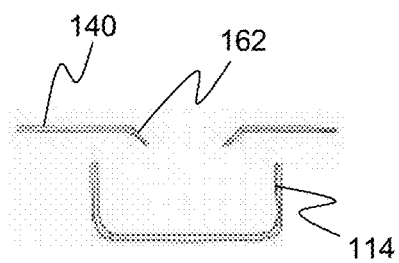
FIG. 3C is a cross-sectional view of a cooking surface for an outdoor griddle at C-C of FIG. 3B, according to an embodiment.

FIG. 3C depicts a cross-sectional view of a cooking surface 112 for outdoor griddle 100 at C-C of FIG. 3B. The angle and relative location of the beveled surfaces 162 to the cooking surface 112 can be seen.

FIG. 3D depicts a cross-sectional view of a cooking surface 112 for outdoor griddle 100 at D-D of FIG. 3B. In this view, the relative locations of the burners 117 comprising the heat source assembly 116 that provides heat can be seen, as well as the location of the drip drawer 114. Multiple burners 117 permit different heat zones to be present on the griddle and enables broader cooking techniques.

In FIGS. 4 and 4A-4D, an embodiment of a tabletop outdoor griddle 100A is shown. In this embodiment, the earlier description of the griddle 100 and its features should be understood to generally apply to the corresponding features of griddle 100A with only a few exceptions, and should be construed as such, unless specifically pointed out.

Outdoor griddle 100A does not have legs extending from its base 120 and no cover for the griddle 100A is depicted. Although not depicted, a removable cover 118 could be used with this design. As in previous embodiments, the cooking surface 112 includes a planar top portion 140, a front edge 142, a back edge 144, a left side edge 146, a right side edge 148, and a right side debris management section 150. In this configuration, a single large opening or trough 170 is present at the front right portion of the griddle 100A. Further, a removable gutter liner 172 is placed within this trough 170 for catching grease and debris.

The removable gutter liner 172 is shaped such that it includes a bottom tray 174 with a small aperture 176 through which liquid grease can drain. (See FIG. 4D, for example) The removable gutter liner 172 further includes a vertically disposed side panel 178 on one side that terminates in a rounded edge lip 180 that is shaped to provide hooked engagement over the right side edge 148. Both the shape of the opening provided by the trough 170 and right side edge 148 relative to rounded edge lip 180 guide placement of the removable gutter liner 172.

Spatula scraper 156 is generally a single angled rigid projection at the front right corner of the griddle extending from the front edge 142 at a location in front of the right side debris management section 150. Spatula scraper 156 provides a lip that projects upward and backward over the cooking surface 112.

Figure 4:
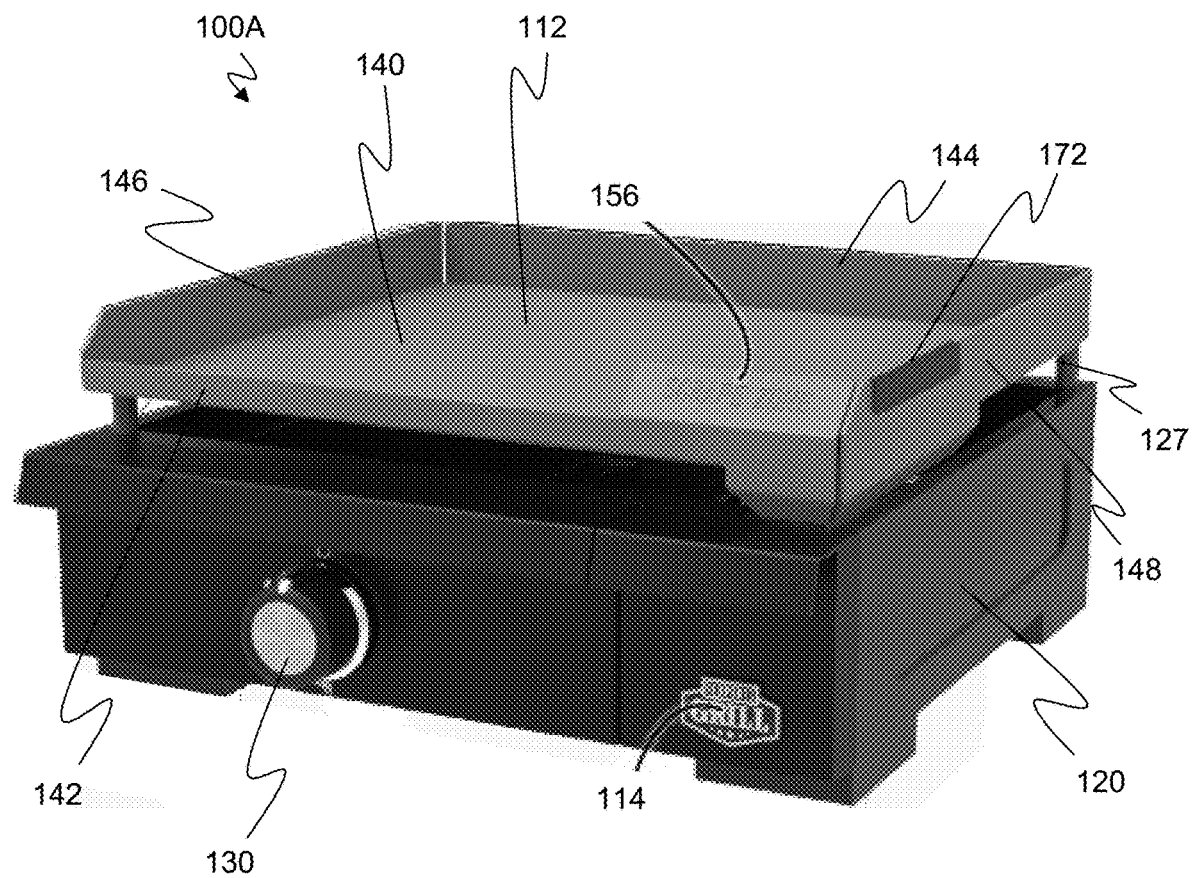
FIG. 4 is a perspective view of a tabletop outdoor griddle, according to an embodiment.
Figure 4A:
FIG. 4A is a perspective view of an open drip drawer of the tabletop outdoor griddle of FIG. 4, according to an embodiment.
Figure 4B:
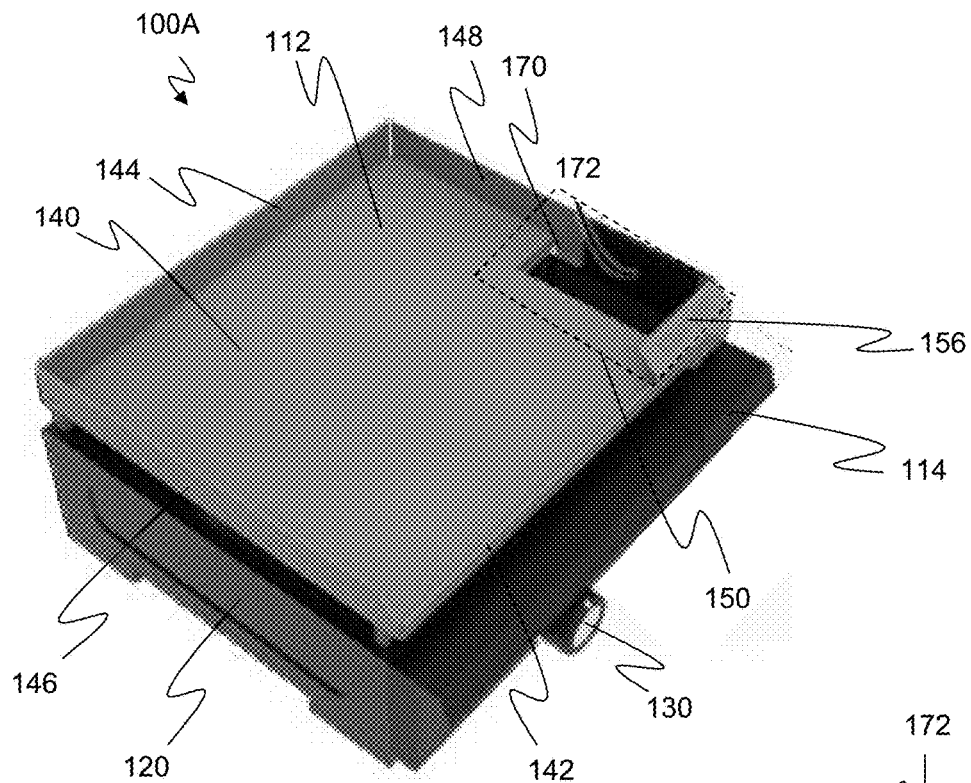
FIG. 4B is a top perspective view of the tabletop outdoor griddle of FIG. 4, according to an embodiment.

FIG. 4A shows the open drip drawer 114 of the tabletop outdoor griddle 100A. Due to the presence of the removeable gutter liner 172 which is can catch larger debris, the drip drawer 114 generally will primarily receive liquid grease.

Figure 4C:
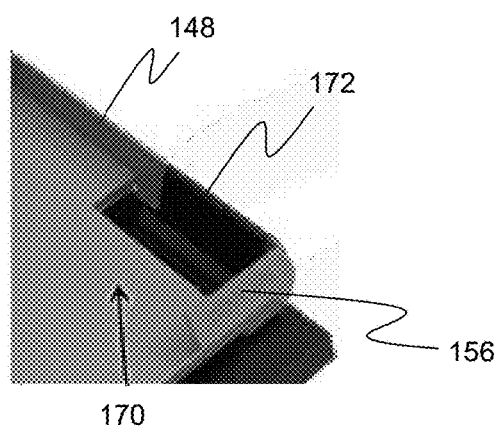
FIG. 4C is a top perspective view of the right-side debris management section of the tabletop outdoor griddle of FIG. 4, according to an embodiment.
Figure 4D:
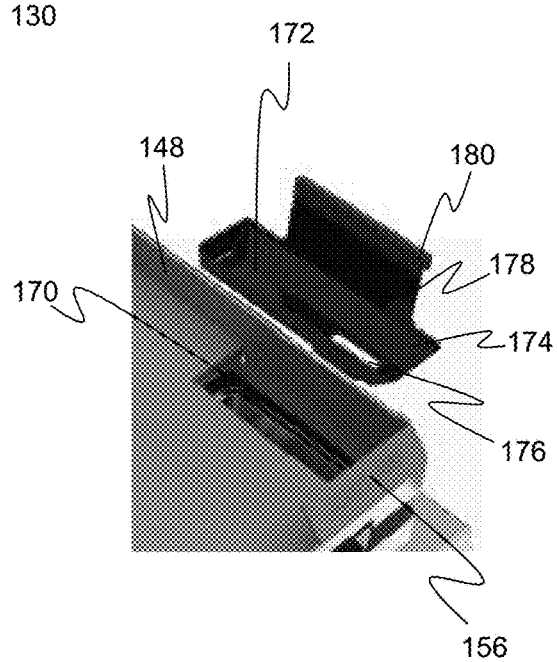
FIG. 4D is a top perspective view of the right-side debris management section of the tabletop outdoor griddle of FIG. 4 where the removable gutter liner is separated from the griddle, according to an embodiment.
Figure 4E:
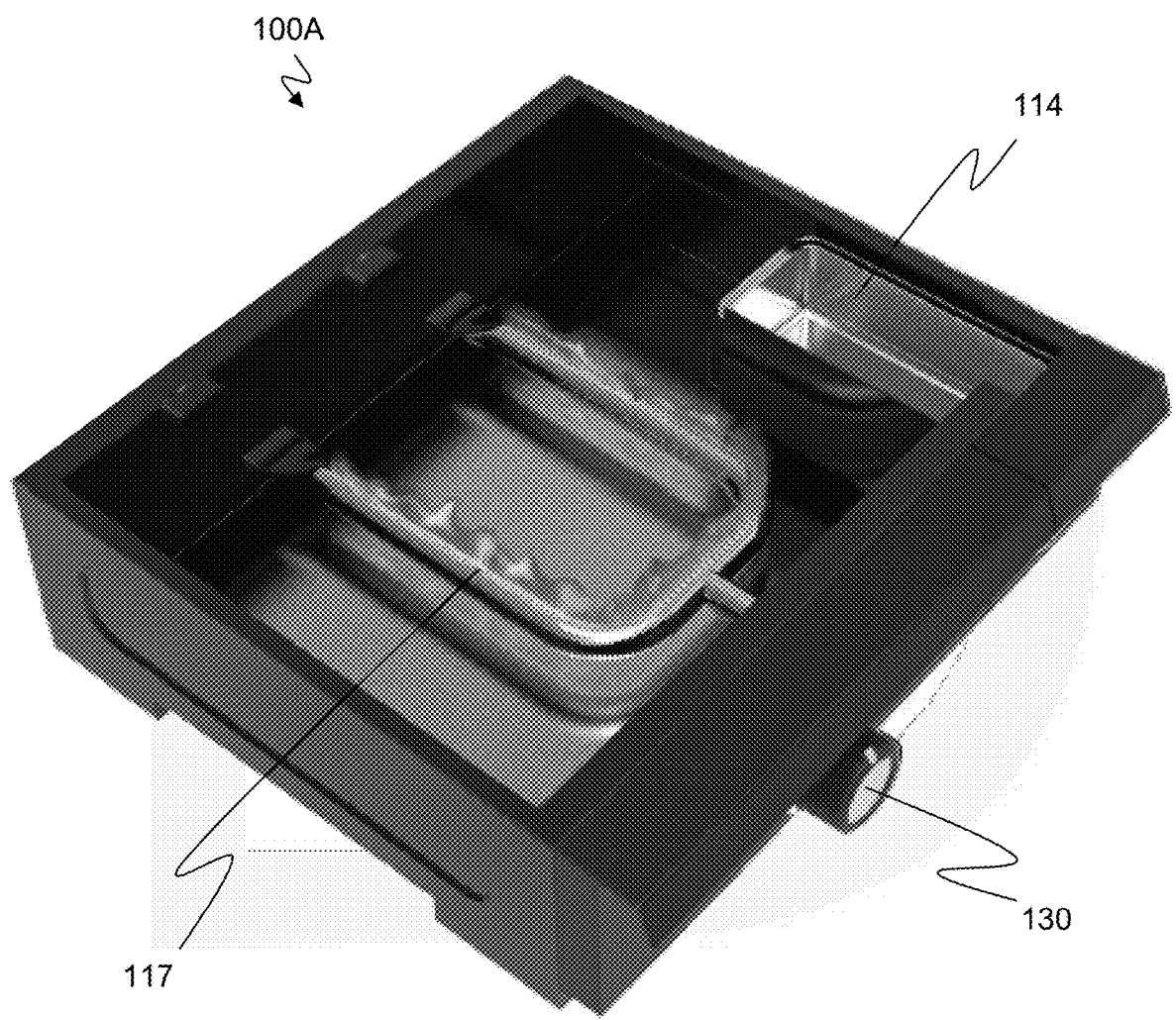
FIG. 4E is a view of the internal components of the tabletop outdoor griddle of FIG. 4, according to an embodiment.

FIGS. 4C and 4D show the right-side debris management section 150 of the tabletop outdoor griddle 100A. The removable gutter liner 172 is separated from the griddle 100A in FIG. 4D.

The internal components of the tabletop outdoor griddle 100A are depicted in FIG. 4E. The U-shaped burner 117 provides the heat source assembly 116 that is controlled by control 130. The relative position of drip drawer 114 is shown as well.

Figure 5:
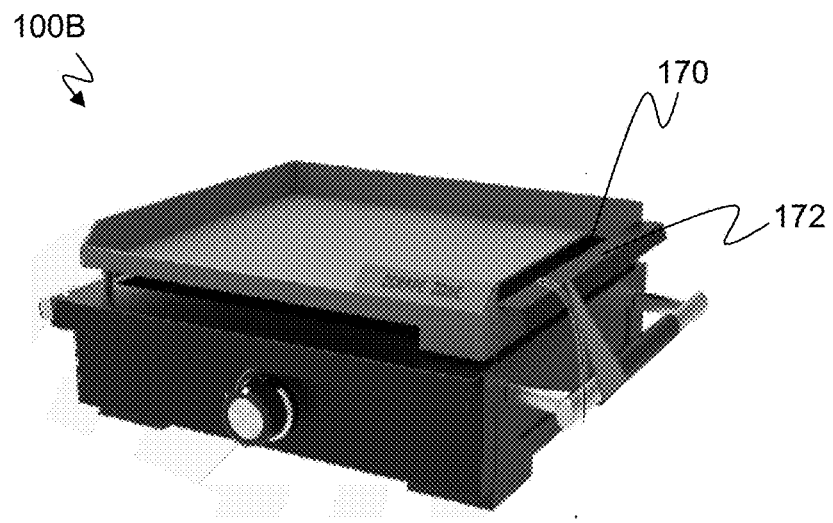
FIG. 5 is a perspective view of an alternate tabletop outdoor griddle, according to an embodiment.
Figure 5A:
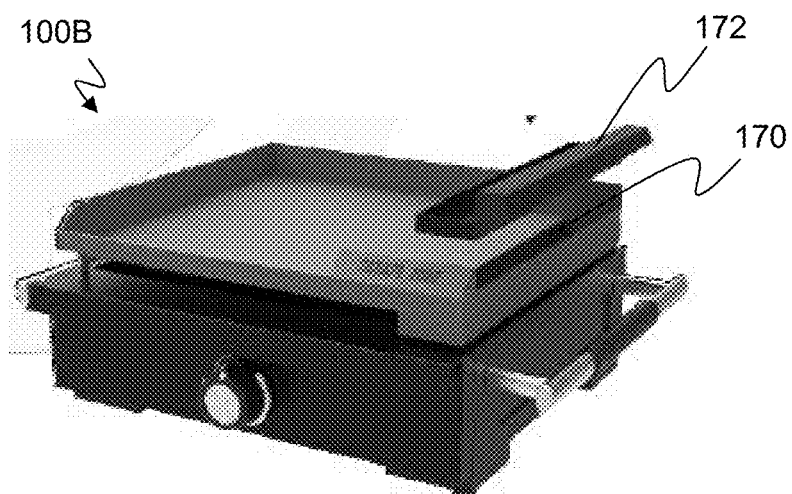
FIG. 5A is a perspective view of the tabletop outdoor griddle of FIG. 5 where the removable gutter liner is separated from the griddle, according to an embodiment.

FIGS. 5 and 5A show an alternate tabletop outdoor griddle 100B. FIG. 5A shows the tabletop outdoor griddle 100B where a removable gutter liner 172 is separated from the griddle 100B, according to an embodiment. In this embodiment, the trough 170 and gutter liner 172 extend a substantial portion of the length of the right side edge 148.

Figure 6:
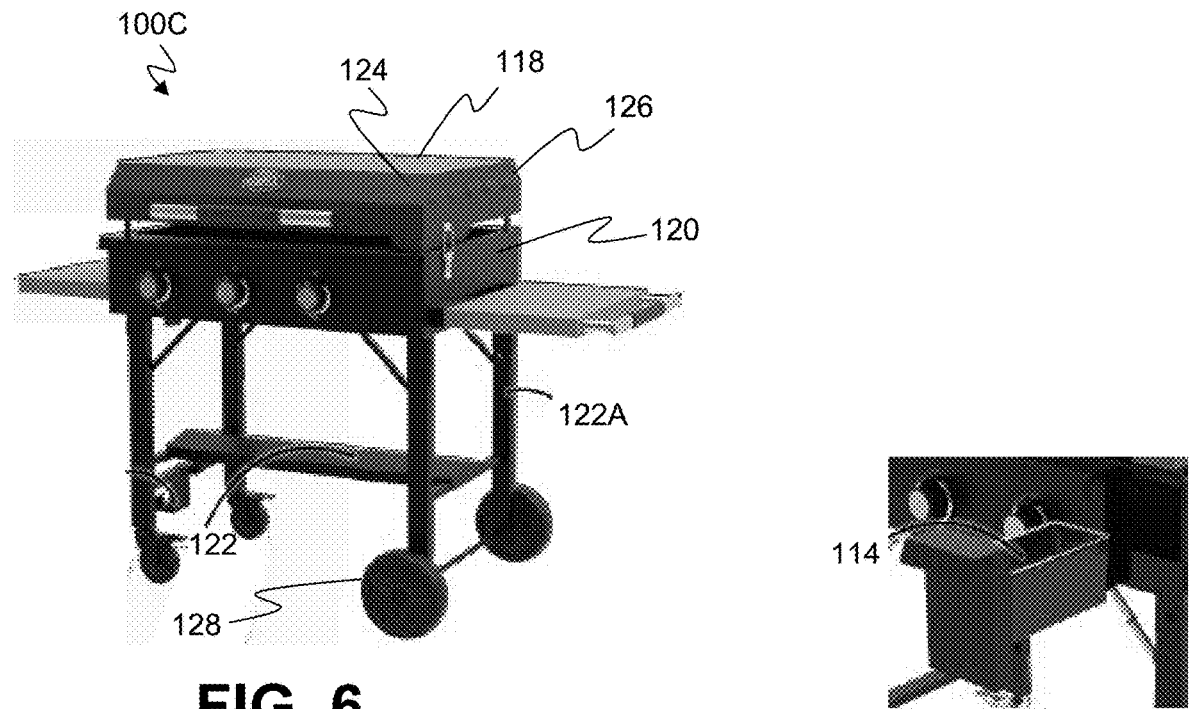
FIG. 6 is a perspective view of an outdoor griddle, according to an embodiment.
Figure 6A:
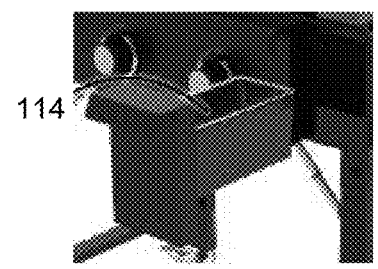
FIG. 6A is a perspective view of an open drip drawer of the outdoor griddle of FIG. 6, according to an embodiment.
Figure 6B:
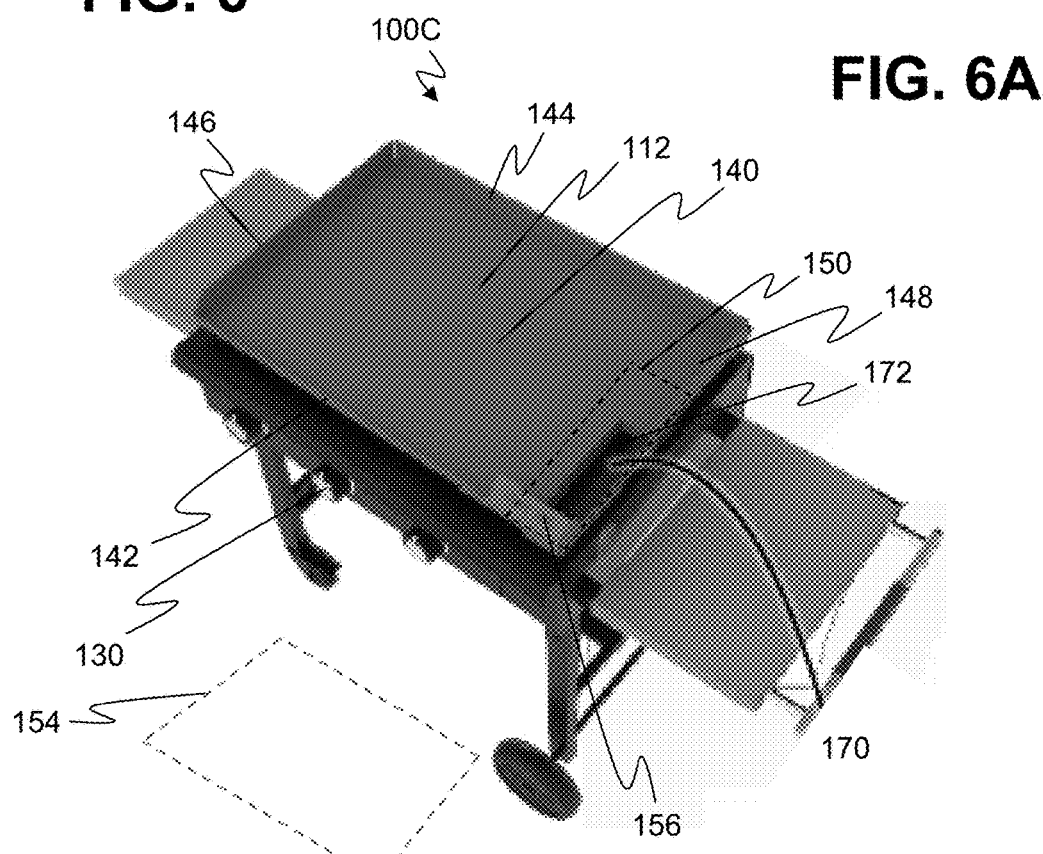
FIG. 6B is a top perspective view of the outdoor griddle of FIG. 6 without a cover, according to an embodiment.
Figure 6C:
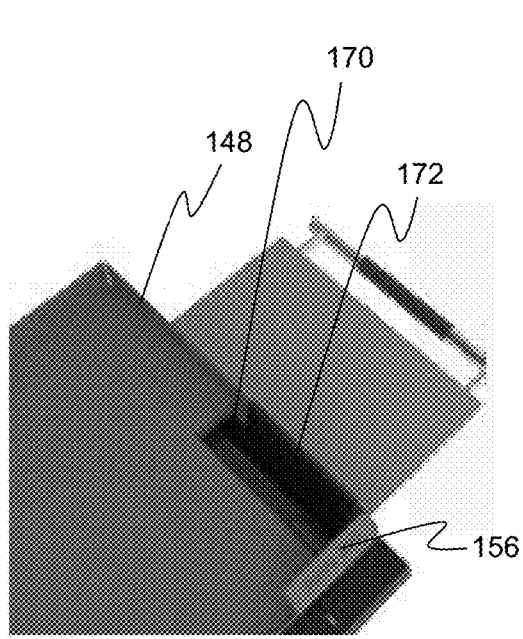
FIG. 6C is a partial top perspective view of the right-side debris management section of the outdoor griddle of FIG. 6, according to an embodiment.
Figure 6D:
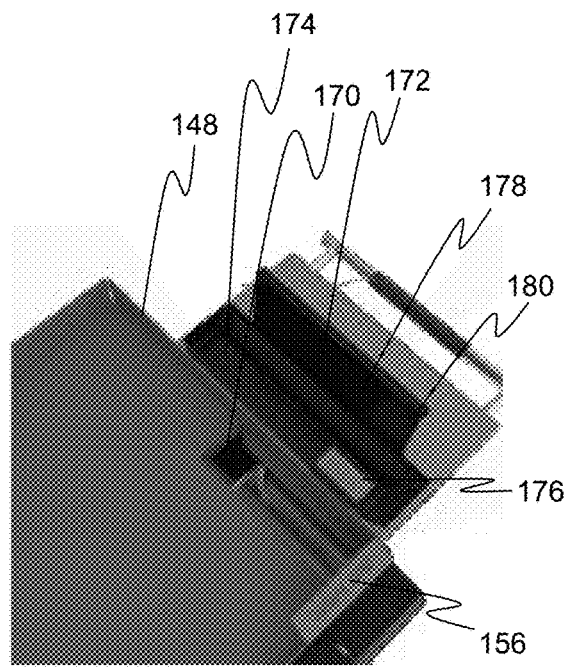
FIG. 6D is a partial top perspective view of the right-side debris management section of the outdoor griddle of FIG. 6 where the removable gutter liner is separated from the griddle, according to an embodiment.
Figure 6E:
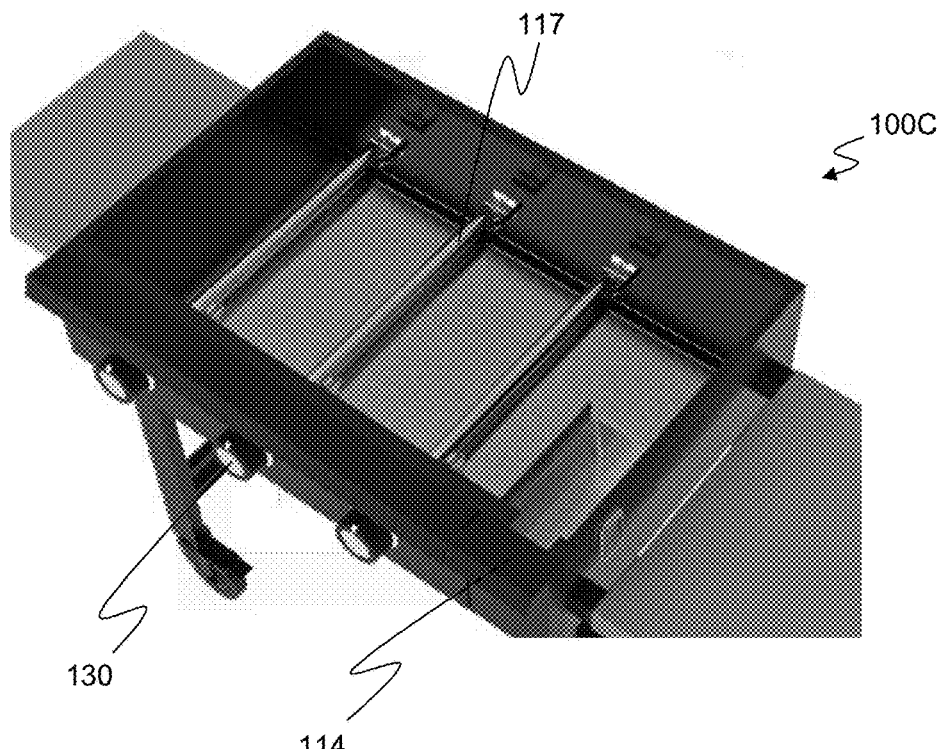
FIG. 6E is a top perspective view showing some of the internal components of the outdoor griddle of FIG. 6, according to an embodiment.
Figure 7A:
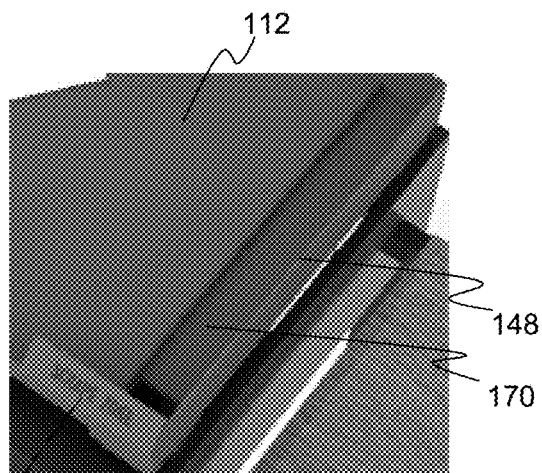
FIGS. 7A-D show top perspective view of alternate right-side debris management sections for an outdoor griddle, according to embodiments.
Figure 7B:
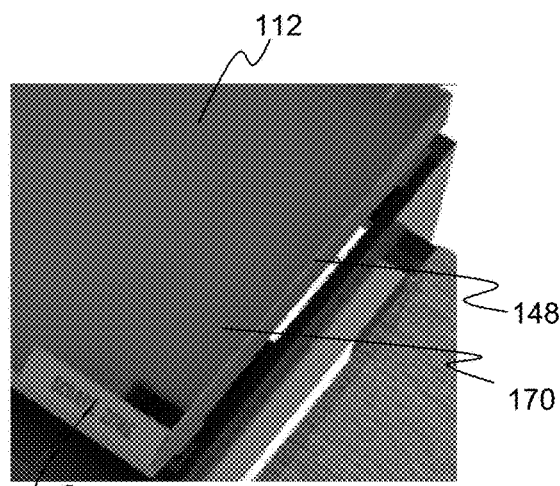
Figure 7C:
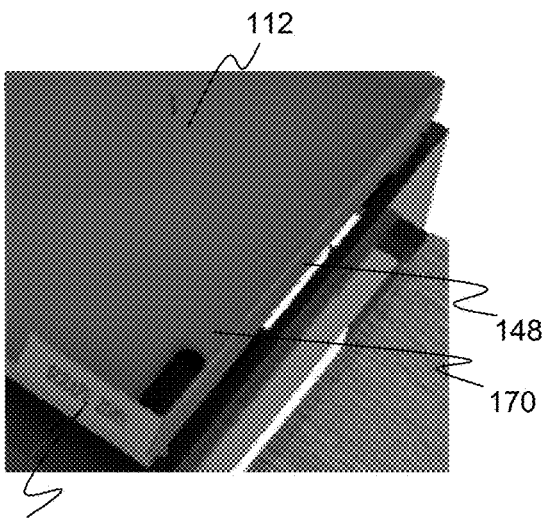
Figure 7D:
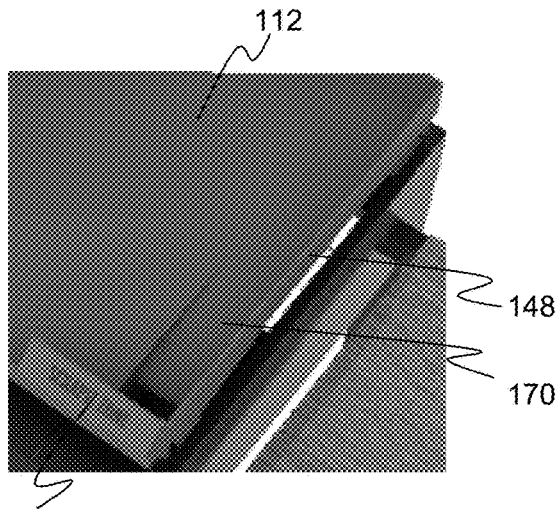

FIG. 6 shows an outdoor griddle 100C, according to an embodiment. FIG. 6A shows an open drip drawer 114 of the outdoor griddle 100C. FIG. 6B shows a top perspective view of the outdoor griddle 100C. FIG. 6C shows the right-side debris management section 150 of the outdoor griddle 100C. FIG. 6D shows the right-side debris management section 150 of the outdoor griddle 100C where the removable gutter liner 172 is separated from the griddle 100C, and FIG. 6E shows the internal components of the outdoor griddle 100C. Shown in FIGS. 6 through 6E are similar griddle components and features to FIGS. 4 through 4E, as well as FIGS. 1A and 1B, although in a somewhat different embodiment. In general, the features should be understood to apply and corresponding descriptions set forth thus far apply to the embodiments of FIGS. 6 through 6E as well.

FIGS. 7A-7D show alternate right-side debris management sections 150 for outdoor griddles 100. The features shown could be used with any of the griddle disclosed herein with appropriate modifications. In general, it should be recognized that troughs 170 of all shapes and sizes can be used.

Figure 8A:
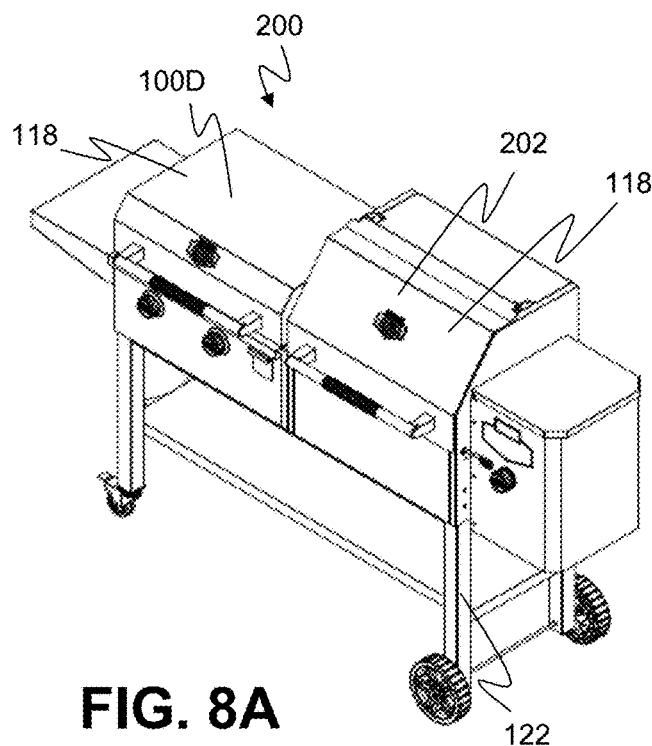
FIG. 8A is a perspective view of an outdoor grilling assembly that includes an outdoor pellet grill and an outdoor griddle, according to an embodiment.
Figure 8B:
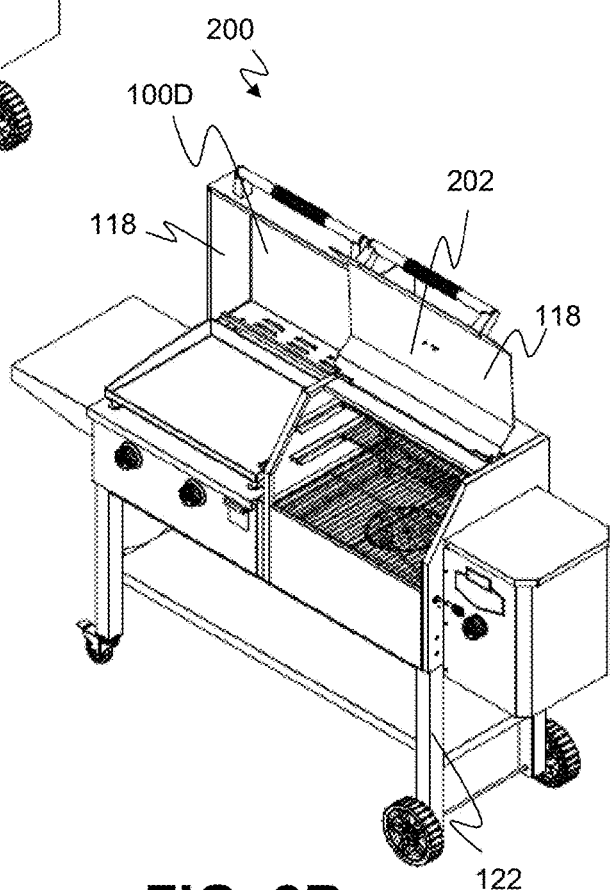
FIG. 8B is a perspective view of an outdoor grilling assembly of FIG. 8A that includes an outdoor pellet grill and an outdoor griddle where the grill and griddle covers are open, according to an embodiment.

FIGS. 8A and 8B show an outdoor grilling assembly 200 that includes an outdoor pellet grill 202 and an outdoor griddle 100D on a common frame/support structure 122. In FIG. 8A, the covers 118 of the respective apparatus are closed, and in FIG. 8B the covers 118 of the respective apparatus are open. In general, the cooking operations of the pellet grill 202 and outdoor griddle 100D are largely separate from one another and rely on separate heat sources. One heat source being gas burners and one heat source being a wood pellet burning pot. However, having both of these types of apparatus in close proximity can permit a broader range of food items to be simultaneously or sequentially prepared.

Various embodiments of systems, devices, and methods have been described herein. These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of U.S.C. § 112 (f) are not to be invoked unless the specific terms "means for" or "step for" are recited in a claim.

What is claimed is:

1. An outdoor griddle, comprising:
   a housing including a pivotally mounted or removable cover;
   a cooking surface of rectangular shape coupled within the housing, including:
      a planar top portion;
      a front edge, comprising a first vertically-disposed panel abutting the planar top portion, proximal to a griddle cook position;
      a back edge, comprising a second vertically-disposed panel abutting the planar top portion, distal to the griddle cook position;
      a left side edge, comprising a third vertically-disposed panel abutting the planar top portion, to the left of the griddle cook position;
      a right side edge, comprising a fourth vertically-disposed panel abutting the planar top portion, to the right of the griddle cook position;
      a right-side debris management section, located in the planar top portion at an area adjacent the right side edge, providing convenient access to right-handed cooking utensil interactions;
      at least one aperture extending in an elongated fashion along the right-side debris management section of the cooking surface that provide passage for grease and debris to drain;
      a drip drawer of elongate shape slideably and removeably coupled beneath the at least one aperture to catch grease and debris, wherein the drip drawer is front loaded at the front edge of the cooking surface and extends a full depth from a front of the cooking surface to a back of the cooking surface of the outdoor griddle;
      a spatula scraper integrally connected to the front edge of the cooking surface extending from the front edge at a location in front of and connected to the right-side edge of the debris management section, wherein the spatula scraper provides a lip that projects upward and backward over the cooking surface;
   and
      a heat source assembly located beneath the cooking surface and controlled by corresponding heat regulation controls.

2. The outdoor griddle of claim 1, wherein beveled surfaces angle downwardly from the planar top portion around the at least one aperture.

3. The outdoor griddle of claim 1, wherein the at least one aperture is a single elongate aperture.

4. The outdoor griddle of claim 3, wherein the single elongate aperture is greater than 80 mm long and greater than 5 mm wide.

5. The outdoor griddle of claim 1, wherein the heat source assembly includes a plurality of elongate burners disposed in parallel fashion.

6. The outdoor griddle of claim 1, wherein the cooking surface is removable from the housing.

7. The outdoor griddle of claim 1, wherein the outdoor griddle is part of an outdoor grilling assembly that includes an outdoor pellet grill having an independent heat source for cooking as well.

8. The outdoor griddle of claim 1, wherein the planar top portion of the cooking surface slopes slightly downward toward the right-side debris management section.

9. An outdoor griddle, comprising:
   a housing;
   a cooking surface of rectangular shape coupled within the housing, including:
      a planar top portion;
      a front edge, proximal to a griddle cook position;
      a back edge, comprising a vertically-disposed panel abutting the planar top portion, distal to the griddle cook position;
      a left side edge, comprising a vertically-disposed panel abutting the planar top portion, to the left of the griddle cook position;
      a right side edge, comprising a vertically-disposed panel abutting the planar top portion, to the right of the griddle cook position;
      a right-side debris management section of the planar top portion including an elongate aperture with beveled edge of lower elevation compared to other portions of the planar top portion, the right-side debris management section adjacent the right side edge, providing convenient access to right-handed cooking utensil interactions by a user to manage grease and debris, wherein the elongate aperture provides passage for grease and debris to drain and wherein the griddle includes a front loaded drip drawer of elongate shape slideably coupled beneath the at least one aperture to catch grease and debris, wherein the front loaded drip drawer is front loaded at the front edge of the cooking surface and extends a full depth from a front of the cooking surface to a back of the cooking surface of the outdoor griddle;
      a spatula scraper integrally connected to the front edge of the cooking surface extending from the front edge at a location in front and connected to the right-side edge of the debris management section, wherein the spatula scraper provides a lip that projects upward and backward over the cooking surface;
   and
      a heat source assembly located beneath the cooking surface and controlled by corresponding heat regulation controls.

10. The outdoor griddle of claim 9, wherein the housing includes a pivotally mounted cover.

11. The outdoor griddle of claim 9, wherein the elongate aperture is less than 120 mm long and less than 15 mm wide.

12. The outdoor griddle of claim 9, wherein the heat source assembly includes a plurality of elongate burners disposed in a parallel fashion.

13. The outdoor griddle of claim 9, wherein the cooking surface is removable from the housing.

14. The outdoor griddle of claim 9, wherein the planar top portion of the cooking surface slopes slightly downward toward the right-side debris management section.

15. The outdoor griddle of claim 9, wherein the outdoor griddle is part of an outdoor grilling assembly that includes an outdoor pellet grill having an independent heat source for cooking as well.

* * * * *